United States Patent [19]

Murphy

[11] 4,338,498

[45] Jul. 6, 1982

[54] TROLLEY POLE LATCH FOR ELECTRIC MULES

[76] Inventor: Monroe Murphy, P.O. Box 624, New Richmond, W. Va. 24867

[21] Appl. No.: 202,084

[22] Filed: Oct. 30, 1980

[51] Int. Cl.³ .............................................. B60L 5/12
[52] U.S. Cl. .................................................. 191/66
[58] Field of Search ................................... 191/64–70

[56] References Cited

U.S. PATENT DOCUMENTS 1,142,935  6/1915  Coseo ..................................... 191/70
2,437,213  3/1948  Slomen ................................... 191/70

Primary Examiner—Richard A. Schacher
Attorney, Agent, or Firm—J. Gibson Semmes; Patrick H. Hume

[57] ABSTRACT

The trolley pole is mounted on a cylindrical bearing member secured to the side of an electric mule or locomotive for pivotal movement about a vertical axis. A latch mechanism provides a segmental plate horizontally disposed acentrically of said cylindrical bearing member for movement with it so as to turn in a horizontal path when the trolley pole and its mounting cylinder are turned, and a latch assembly adjacent said path fixed to a contiguous portion of the locomotive housing having a horizontally pivoted detent that normally rests with its free end within the path of the segmental plate in registration with the latter so as to lock the plate and its associated cylindrical mount and trolley pole in one selected position. The detent is moved about its horizontal axis to displace its free end from the path of the segmental plate to allow the latter to turn with the cylindrical bearing and trolley pole to a second selected position, where the detent again drops into locking position to prevent accidental turning of the trolley pole. A lever mechanism extends across the locomotive from a position accessible to the motorman to the latch assembly to afford remote control of the detent.

5 Claims, 3 Drawing Figures

TROLLEY POLE LATCH FOR ELECTRIC MULES

BACKGROUND OF THE INVENTION

1. Field of Invention

Trolley poles for electric vehicles, especially industrial vehicles, such as mine mules, that work in confined areas, must be rotatably mounted so that the trolley carried thereon may be pulled, rather than pushed, along the overhead trolley wire, irrespective of the direction the vehicle of application might be traveling at any given time. This necessitates that the trolley pole be turned 180° every time the direction of travel is reversed, which is usually the responsibility of the motorman or operator of the vehicle. If the pole is constrained against accidental turning merely by reliance upon the trolley's tracking the trolley wire, a hazardous situation for the operator arises every time the trolley jumps off the trolley wire, when the heavy trolley pole is freed to thrash about, sometimes hitting the operator in the head. Even if the trolley stays in place, the operator, upon manually turning the trolley pole for reversing the direction of travel, must lean over into the confined space between the locomotive and the overhead to effect the transfer, thus to incur the risk of accidentally contracting the trolley wire that could prove fatal.

2. Description of the Prior Art

Devices for restraining the accidental turning of trolley poles, as in conventional street railway trolley cars, have been known since the last century; e.g., the U.S. Pat. Nos. to Thomson, 440,665 and Brown, 582,259, both of which show turntable mounts for trolley assemblies, and latch mechanisms for locking them against turning from a selected latched position. In such cases, unlimited space and ease of accessibility allow for unlatching the pole and turning it to the second selected position without hazard to the operator, who may accomplish the entire operation from inside the car (Thomson, FIG. 1), or remotely by ropes on lines from alongside the car, as suggested by Brown.

More closely identified with the problem, however, are the U.S. Pat. Nos. to Shanaberger, 1,437,780 and Packer, 1,848,140, both of which deal with trolley mounts and controls for electric mine mules or locomotives. Still another adaptation employs an air-cylinder to actuate a cam retainer in response to a foot-treadle valve on the floor of the operator's cab. These devices are too elaborate and complicated given the rugged environment in which they are expected to operate, and are subject to accidental misuse with consequent peril to the operator.

SUMMARY OF THE INVENTION

The present invention comprises a cylindrical mount for a trolley pole on an electric mule, which mount is revolvable about a fixed vertical axis on a top surface, and to one side of, the mule. The cylindrical mount has a latch mechanism associated with it for retaining it, and, hence, the trolley pole pivoted thereto, in one of several preselected positions, depending on the direction of travel of the mule. The latch mechanism is that to which the present invention is directed. Fastened to the cylindrical mount closely adjacent to the top surface on which it is mounted is a segmental plate configured for engagement by a detent horizontally pivoted to fixed bearings on the top surface proximate to the segmented plate. In a preferred form, the detent constitutes a lever of the first class, the fulcrum of which is sufficiently off-center remote from the segmental plate to cause the proximal end of the detent to ride against the plate and to drop into its conformal configurations by force of gravity alone. A lever of the second class operable from the remote side of the mule from the operator's station engages the distal end of the detent to raise it to a position above the segmented plate, thus releasing the latter so that the associate trolley mount and pole may be turned to another preselected position.

DESCRIPTION OF A PREFERRED EMBODIMENT

Figure 1:
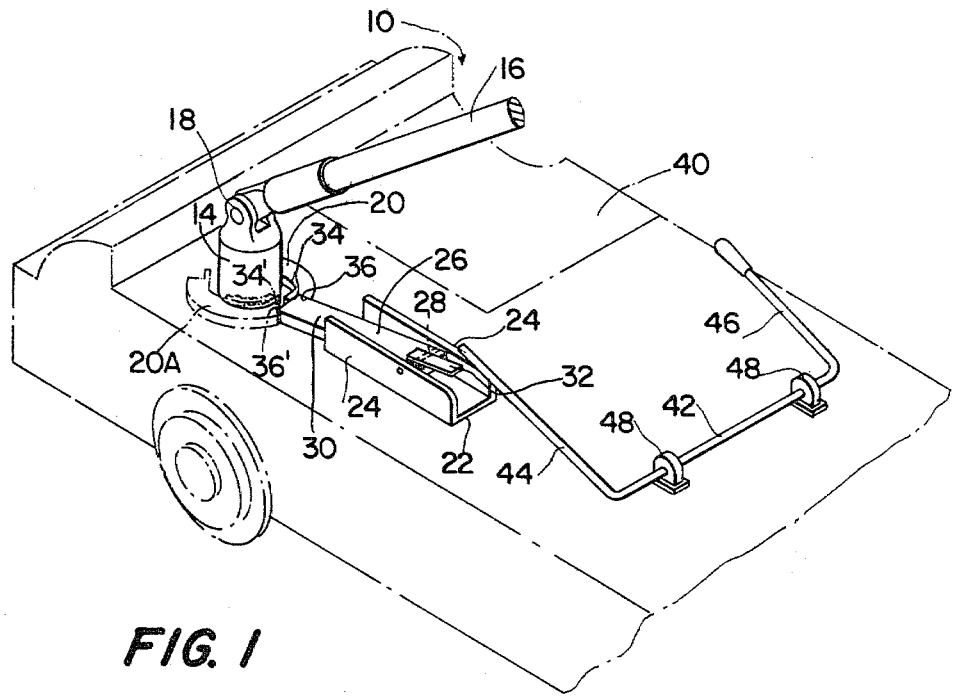
FIG. 1 is a schematic perspective view of a portion of an electric mule, showing the trolley pole mount and latching mechanism relative to the operator's station according to a preferred embodiment of the invention.

In the drawings, like reference characters refer to like parts throughout. A mine mule 10 has a body with top surface 12 on or adjacent which a cylindrical bearing member 14 is mounted for revolution about a vertical axis. A trolley pole 16 is carried by the cylindrical bearing member 14 for pivotal movement around a horizontal pivot bearing 18 about which the pole 16 is raised or lowered. The pole 16 can also be turned about the vertical axis of the cylindrical bearing member 14 from the position shown in full lines in FIG. 2, to the position shown in phantom lines 16A.

Rigidly affixed to the cylindrical bearing member 14, as, for instance, by welding, is a segmental plate 20 acentrically mounted parallel and closely adjacent to the top surface 12 of the electric mule. The plate 20 travels through a circular path 20A when the cylindrical bearing member 14 is revolved to change the position of the trolley pole 16. The segmental plate 20 is one element of a latch mechanism intended to lock the trolley pole into—and to release the trolley pole from—one of several preselected positions, represented by 16 and 16A in FIG. 2. The cooperating elements of such latch mechanism will now be described.

Figure 2:
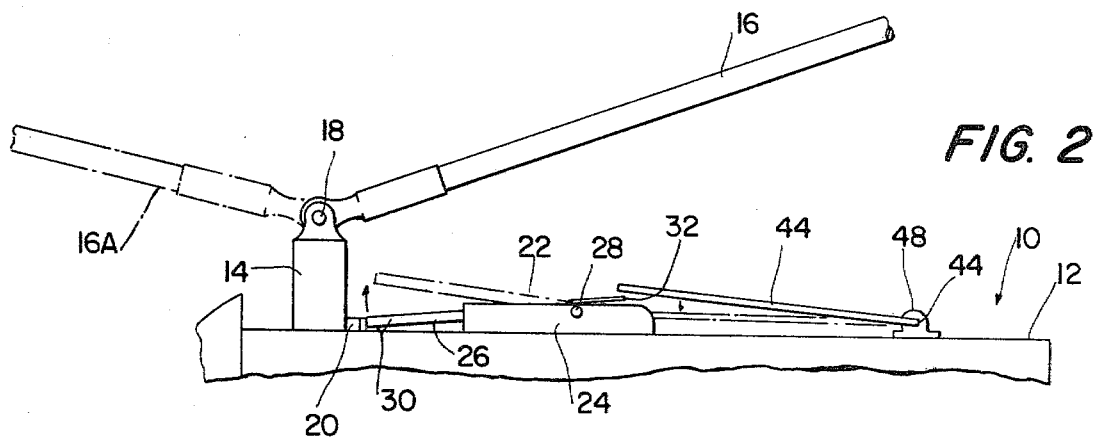
FIG. 2 is a side elevational view of a mine mule, as that simulated in FIG. 1.
Figure 3:
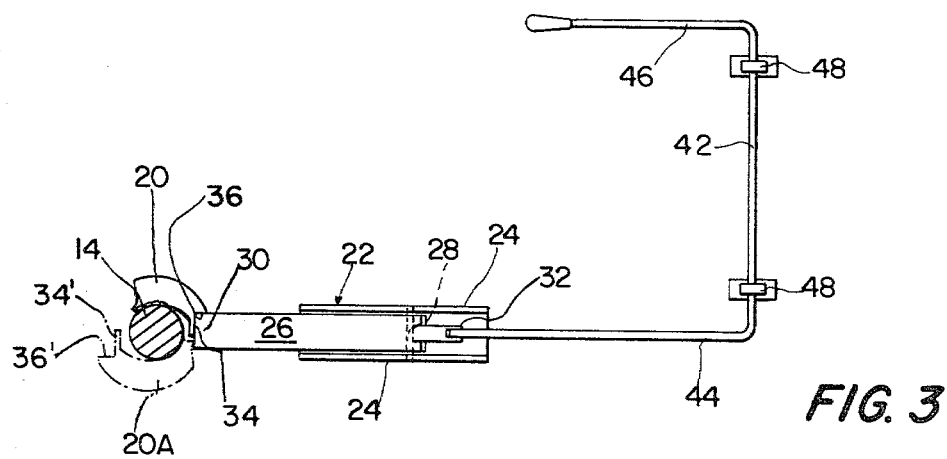
FIG. 3 is a plan view of the trolley pole mount and latch mechanism shown in FIGS. 1 and 2.

An elongated U-shaped fulcrum mount 22 has parallel sides 24 between which a detent 26 is fulcrumed, as at 28, to constitute a lever of the first class with its end 30 proximate to the segmented plate 20 (proximal end) being overbalanced on the fulcrum 28 with respect to its distal end 32, so that it tends to fall of its own weight into the path 20A of the segmental plate 20. The segmental plate 14 has conformal relieved portions 34-34', 36-36' that confront the proximal end 30 and an adjacent side of the detent 26 when engaged therein in the latched position. The illustrated embodiment contemplates two latched positions: when the pole is, as shown in FIG. 2, at 16, then, relieved portions 34-36 of the plate 20 would confront the proximal end 30 of the detent 26; when the pole is at 16A, relieved portions 34'-36' would be the effective surfaces confronting the proximal end of the detent, in either case locking the trolley pole in such preselected position. Both the surfaces 34-34' and 36-36' perform the locking function at the end, as well as at the side, of the detent 26, respectively.

In the interest of avoiding accidental contact with the highly charged trolley wire by personnel using or operating mine mules, or similar electrical equipment, the trolley wire is customarily run along the side of the overhead that is remote from that on which the operator, and other personnel, boards and leaves the locomotive or its train of cars. Thus, the trolley pole and its mounting are predisposed to the remote side of the electric mule, making access thereto more difficult and hazardous. As shown in FIG. 1, the trolley assembly is on the left, while an operator's station 40 is schematically represented as being on the right.

In order to release the trolley latch from the near side within reach of the operator, or those attending the train, a release bar 42, having a lever 44 of the second class extending 90° from it, is conveniently disposed across the mule on the surface 12, or other convenient location, so as to dispose the end of the lever 44 in overlapping relation with the topside of the distal end 32 of the detent 26. A crank handle lever 46 extends from the release bar 42 at any convenient location on the near side of the vehicle to be readily accessible to the operator in station 40, or attendants standing alongside. When the crank handle 46 is depressed, the release bar is turned (counterclockwise in FIG. 2) to cause lever 44 to bear down on the distal end 32 of the detent 26, thus causing the proximal end 30 thereof on the far side of the fulcrum 28 to raise, as shown in phantom lines in FIG. 2, thereby releasing the segmental plate 20, and its associated trolley pole mount, to execute an 180° turning movement. During the turning movement, the proximal end 30 of the detent rides on the flat top surface of the segmental plate 20, until the opposite relieved portions 34'-36' arrive beneath it, allowing the proximal end of the detent once again to fall into latching position to lock the trolley pole in the second position 16A.

The gravitational force acting on the proximal end of the detent 26 to urge it into latching position with the segmental plate 20 may be augmented by a compression spring disposed beneath the distal end of the detent (not shown) that would bias the distal end upwardly and the proximal end downwardly on the opposite side of the fulcrum 28. Also, the fulcrum 28 may be supported in any other suitable manner other than that shown, although the latter, welded to the top surface 12, is a preferred form in the interests of availability, efficiency, and economy. The same may be said of the fulcrum bearings 48, shown as pad eyes welded to the same surface 12, although any suitable bearings are contemplated.

Other variations will be apparent to those skilled in the art, whereby it is not intended that the invention be limited to the precise embodiments illustrated and described herein, but that the ensuring claims be interpreted commensurately with the advance the invention has made in the art.

I claim:
1. In an electric mule trolley system:
(A) a trolley pole mounted for movement about horizontal and vertical axes to the remote side of the mule,
(B) the vertical axis mount comprising a cylindrical bearing carried on or adjacent to a top surface of the mule,
(C) a segmental plate rigidly affixed to said cylindrical bearing in acentric relation to its vertical axis,
(D) a detent horizontally pivoted to a fixed fulcrum proximate to said segmental plate in overlapping relation therewith,
(E) said segmental plate having relieved portions upon opposite sides of said vertical axis that conform, and engage, respectively, the proximal end and one included side of said detent when disposed in either of two preselected positions, and
(F) a lever bar mechanism for actuating said detent extending across said mule from its remote side to the opposite or near side thereof.
2. Claim 1, in which said segmental plate between said relieved portions is a smooth bearing portion against which said detent can bear when said plate moves between the two preselected positions.
3. Claim 1, in which said detent is a lever of the first class.
4. Claim 1, in which said lever bar mechanism has at least one lever of the second class in engagement with said detent.
5. Claim 4, including a motorman's station, said lever bar mechanism having manual actuating means at the near side of the mule accessible to a motorman in said station.

* * * * *